United States Patent [19]

Nuver et al.

[11] 4,209,738
[45] Jun. 24, 1980

[54] REGULATION CIRCUIT

[75] Inventors: Eric L. H. Nuver; Robert F. Gaertner, both of San Marcos, Tex.

[73] Assignee: Esquire, Inc., New York, N.Y.

[21] Appl. No.: 808,969

[22] Filed: Jun. 22, 1977

[51] Int. Cl.² .............................................. G05F 1/40
[52] U.S. Cl. ............................ 323/22 SC; 307/252 F;
307/297; 323/34; 363/85
[58] Field of Search .................... 307/239, 246, 252 F,
307/296 R, 297; 323/8, 22 SC, 24, 34, 38;
361/18; 363/85

[56] References Cited

U.S. PATENT DOCUMENTS

| | | | |
|---|---|---|---|
| 3,335,353 | 8/1967 | McVey et al. | 363/85 |
| 3,668,515 | 6/1972 | Horne | 323/22 SC |
| 3,684,919 | 8/1972 | Cramer | 307/252 F |
| 3,719,858 | 3/1973 | Gilbreath | 323/24 |
| 3,908,159 | 9/1975 | Griffey | 363/85 |
| 3,952,241 | 4/1976 | Takemura et al. | 323/24 |
| 3,991,343 | 11/1976 | Delpy | 307/252 F |

*Primary Examiner*—William M. Shoop

*Attorney, Agent, or Firm*—Frank S. Vaden, III

[57] ABSTRACT

A regulation circuit for providing timing gate signals to the dc power section of a power supply, the regulation circuit utilizing phase angle conduction of a programmable unijunction transistor. The conduction angle is determined by the occurrence of the cycles of the ac source voltage unless earlier conduction is determined by the sensed dc voltage. Early conduction occurs when the control voltage to the PUT is allowed to build up beyond a predetermined level when the sensed dc voltage is low. When the sensed dc voltage is high, an electronic switch closes to discharge a storage element to prevent control voltage build up and, hence, early conduction. Ac source voltage failure also causes closing of the electronic switch to prevent undue regulation of the power section output at such times and to permit storage capacitors therein to maintain a dc output until source voltage is reestablished. Soft start elements in the form of long time constant components ensure against the application of peaked voltages during initial start up and in the presence of power surges.

12 Claims, 2 Drawing Figures

REGULATION CIRCUIT

BACKGROUND OF THE INVENTION

1. Field of the Invention

This invention relates to power supply regulation, and more particularly to a regulation circuit for providing timing gate signals to a power section of a power supply, even in the presence of temporary interruptions of an applied ac source voltage.

2. Description of the Prior Art

The maintenance of power to a load, even in the presence of momentary interruptions, is critical in many applications. However, none may be more critical than in systems wherein the load is represented by high intensity, gaseous-discharge lamps. The reason for this is that even momentary cessation of power will cause the lamps to go out, requiring normally two minutes and longer to restrike and even longer to reach full brightness.

In addition to the maintenance of power in the presence of line voltage interruptions, it is also highly desirable to maintain a relatively stable voltage to many loads, such as lamp circuits, even if there are no line voltage interruptions. The main reason for this is to ensure against fluctuations that may shorten lamp life or otherwise cause lamp injury.

Circuits in the past have employed combinations of resistors, capacitors and even diodes to provide regulation to power supplies, but these have amounted to little more than filtering systems preventing widely varying excursions.

A circuit somewhat suitable for providing a degree of desirable regulation is disclosed in FIG. 7 of copending Patent Application Ser. No. 654,926, filed Feb. 2, 1976, commonly assigned. In that circuit, a phototransistor controlled by the brightness of a light emitting diode connected across the dc output of the power supply determines the application of gate voltage to a triac. This conduction timing determines the operation of a bridge in the power supply, and hence provides regulation.

This circuit does not ensure against sudden surges opening the power circuit, as in the present circuit, which would basically ignore such surges and prevent them from effecting the operation of the power section of the power supply. More importantly, perhaps, it does not ensure the maintenance of a dc voltage output in the presence of momentary interruptions of the line source of ac power.

Therefore, it is a feature of this invention to provide an improved regulation circuit that provides regulation to the dc output of a power section of a power supply and prevents cessation of the dc output even in the presence of momentary line interruptions.

It is another feature of this invention to provide an improved regulation circuit that provides regulation to the dc output of a power section of a power supply and ensures against surges caused by power initiation or sudden changes in line voltage from being applied to the power section, the circuit employing active electronic switching and not merely passive filtering.

SUMMARY OF THE INVENTION

The embodiment of the present invention disclosed herein employs a programmable unijunction transistor (PUT), the gate or reference voltage being determined by the timing of the ac source voltage and the anode or control voltage being determined by the sensed dc voltage being regulated. A low sensed dc voltage causes an advanced phase angle conduction to the PUT. A high sensed dc voltage causes a delayed phase angle conduction to the PUT. The conduction of the PUT controls the application of control gate signals to the output bridge of the power section of the power supply, to provide the desirable regulation.

The network sensing the dc voltage includes an electronic transistor switch that is closed to prevent a high control voltage level to the PUT from occurring when the sensed dc voltage is higher than normal. When the sensed dc voltage is normal or lower than normal, a high control voltage level is allowed to build up and be applied to the PUT, thereby lengthening its conduction phase angle. This network also includes an operational amplifier that ensures closing of the transistor switch when there is a power failure to prevent an attempt to control the power section output under these adverse conditions, one or more storage capacitors in the power section maintaining at least an exponential decaying output in such event.

A Zener diode provides a steady-state voltage level for the reference voltage to the PUT. At the end of each half cycle of the ac source, however, this level reduces to force the firing of the PUT and therefore ensure that at least the delayed phase angle conduction of the PUT occurs each half cycle.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings

DESCRIPTION OF ILLUSTRATED EMBODIMENT

Figure 1:
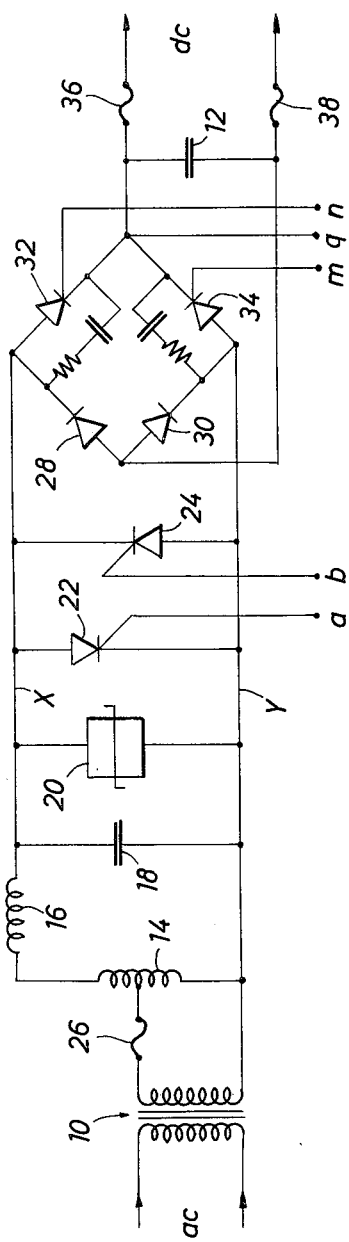
FIG. 1 is a schematic diagram of a power supply operable in conjunction with gate control triggers from the regulation circuit of the preferred embodiment thereof shown in FIG. 2.

Now referring to the drawings and first to FIG. 1, the power section of a power supply capable of being controlled by the regulation circuit to be hereinafter described, is illustrated. Basically the circuit converts an ac source voltage applied across input transformer 10 to a desirable dc voltage applied at the output across output capacitor 12.

The input voltage level is transformed in transformer 10 and further boosted in tapped transformer 14 before passing through the filter section comprising inductor 16, capacitor 18 and varistor 20. These components are included to remove transients that may be present in the applied ac source voltage.

Back-to-back SCR's 22 and 24 are connected across the ac line of the power supply, the cathode of SCR 22 being applied to the line marked "Y" and the cathode of SCR 24 being connected to the line marked "X". The gate of SCR 22 is connected to terminal "a" and the gate of SCR 24 is connected to terminal "b" for external triggering by an overload protection circuit. It may be seen, however, that the application of a trigger signal to an SCR effectively shorts together lines X and Y and thereby provides an overload current for the overload protection device, sometimes referred to as an overload cut out device or fuse 26, located in the line to the centertap of transformer 14.

A rectifier in the form of a bridge circuit is connected to lines X and Y, the basic bridge comprising back-to-back diodes 28 and 30 connected across lines X and Y and SCR's 32 and 34 connected front-to-front across lines X and Y. The output from the bridge circuit is then taken from the common connection of the diodes and the common connections of the SCR's. It may be also noted that the SCR's are each connected in parallel with a series combination of a resistor and a capacitor to provide snubber operation by providing a limitation of the rate of voltage change across the respective SCR's. The gate of SCR 32 and the gate of SCR 34 are connected respectively to terminals "n" and "m", the common connection being denoted as terminal "q". These connections provide for phase angle operation of the SCR as controlled by an external circuit in a manner to be hereinafter explained. Such phase angle control is convenient for varying the dc output of the overall circuit for application to a load desirably connected to receive such treatment. Such a load might be a lamp drive circuit. The output is protected by fuses 36 and 38.

Figure 2:
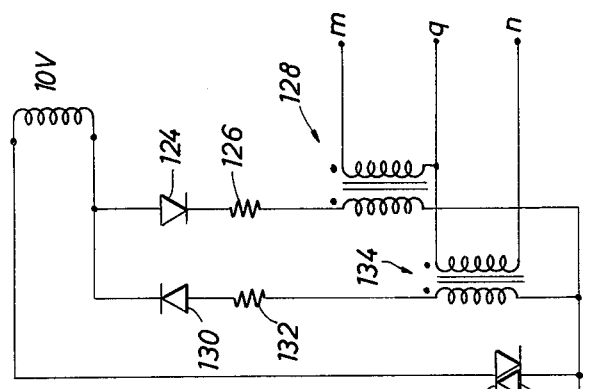
FIG. 2 is a schematic diagram of a preferred embodiment of a regulation circuit in accordance with the present invention.
Figure 2:
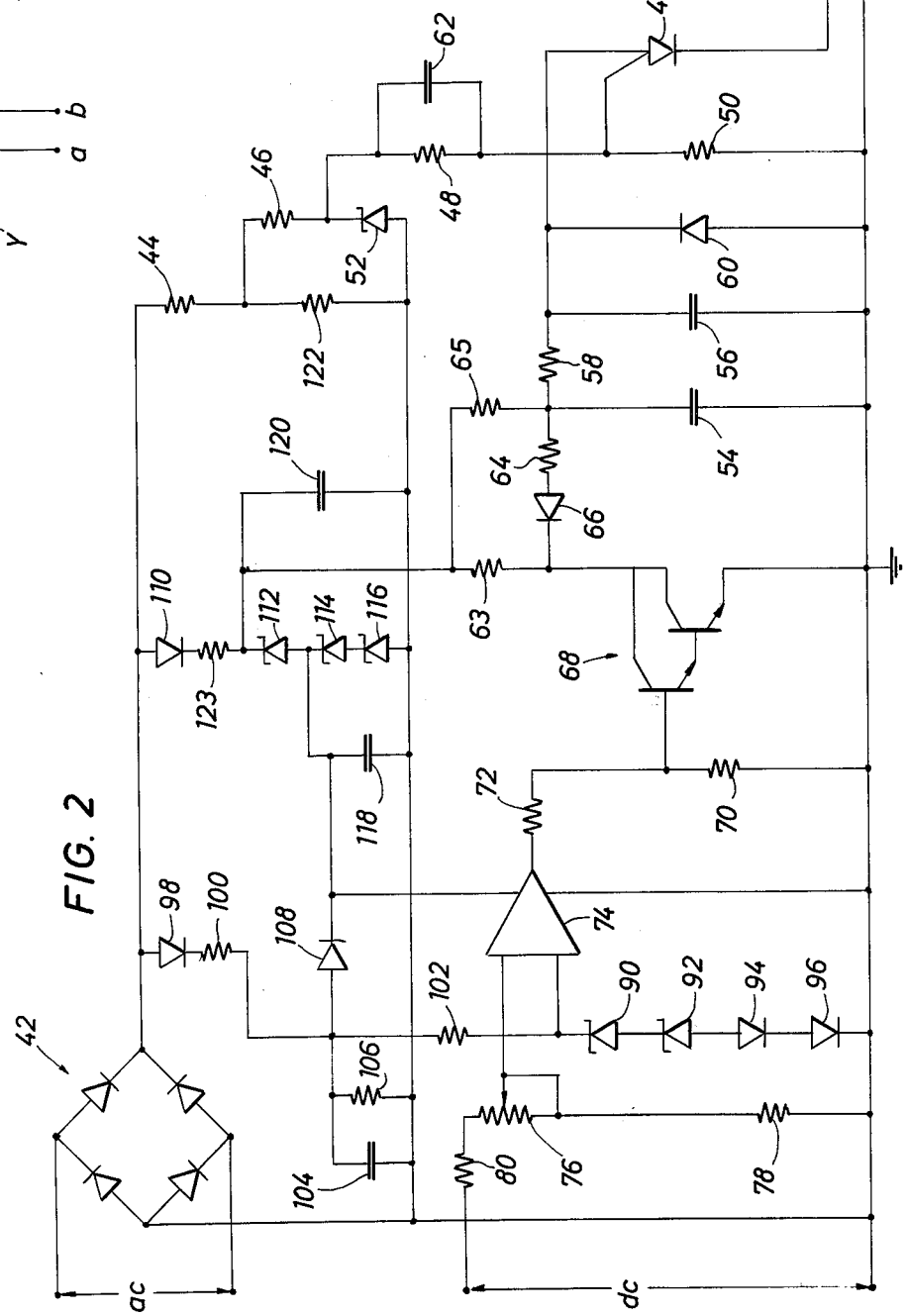

Now referring to FIG. 2, a regulation circuit for controlling the timing of gate signals n and m to SCR's 32 and 34 is illustrated. The principle control element of the regulation circuit is programmable unijunction transistor (PUT) 40.

The gate connection to PUT is connected to a full-wave rectified dc voltage derived from the ac source via rectifier bridge 42. Resistors 44 and 122 provide the load to the bridge, the junction therebetween providing a voltage divider point for current limiting resistor 46 to Zener diode 52. The voltage at the cathode of the Zener diode is applied through the parallel combination of resistor 48 and capacitor 62, the voltage being divided by resistor 50, to determine the actual voltage applied to the gate of PUT 40. For convenience, this may be referred to as the "reference" voltage.

Each rectified half cycle of the ac source causes the voltage on the Zener diode to build up from a zero volt starting point to a predetermined dc level, typically 13 volts, and then to return again to a zero-volt level. This is basically the wave shape of the reference voltage applied to the gate of PUT 40.

The timing of the conduction of PUT 40 is determined by the voltage difference between the reference voltage applied to the gate and the "control" voltage applied to the anode of PUT 40. That is, both the voltage applied to the anode and the voltage applied to the gate of PUT 40 are important to its conduction. The anode voltage must be slightly larger than the gate voltage to cause conduction. In other words, conduction is dependent on the arithmetic difference between the voltage applied to the anode and gate. Therefore, the setting of either of these voltages may be used to "program" the conduction of the PUT. As will be explained hereinafter, the variable setting of the FIG. 2 circuit is with respect to the connections of the anode of the PUT, which are derived from the dc output voltage of the power supply being sensed and regulated. For convenience, this dc output voltage is referred to herein as the "sensed dc voltage".

It should be apparent, however, that since the gate voltage applied to the PUT goes to zero each half cycle, and since the anode voltage is positive, there is a forced firing of the PUT each half cycle, regardless of variations that may or may not occur with respect to the anode voltage. Of course, if the anode-applied control voltage has exceeded the gate-applied reference voltage by the critical firing amount prior to the time that the gate voltage goes to zero, then the PUT will have already been put into conduction. It is the timing of the occurrence of conduction, or the so-called conduction angle, that produces the regulation control signal. Typically, a PUT conducts when the anode voltage is about one-half volt larger than the gate voltage.

Now turning to the anode network to PUT 40, the anode is connected to a time constant network including capacitors 54 and 56 and resistor 58. A diode 60 connected to the anode of PUT 40 and capacitor 62 connected across resistor 48 and to the gate of PUT 40 ensure reset or turn off of the PUT following conduction.

The control voltage applied to the anode of PUT 40 may be thought of as comprising two constituent parts, that which builds up on capacitor 56 and that which builds up on capacitor 54. For convenience, the voltage built up on capacitor 56 is referred to herein as the "supply" control voltage component and the voltage that builds up on capacitor 54 is referred to herein as the "variable operating" control voltage component.

The charging path for the voltage build on capacitor 56 is from the cathode of Zener diode 112 and through resistors 65 and 58. Capacitor 54 is relatively large with respect to capacitor 56 and resistor 58 is relatively large. Full build up on capacitor 56 (to the level sufficient to cause triggering of the PUT) is achieved in approximately 7 milliseconds, provided no discharge path is provided, thereto. Once PUT 40 is rendered conductive, the voltage on capacitor 56 is rapidly discharged through the PUT.

Voltage build up on capacitor 54 is likewise through resistor 65. The time constant value of resistor 65 and capacitor 54 are such that full exponential build up on capacitor 54 requires on the order of 200 milliseconds.

The discharging procedure for capacitors 54 and 56 provides the determination of the total anode control voltage. When discharge does not occur before the control voltage reaches the level for triggering the PUT, then the control voltage is said to be "advanced". If discharge occurs before such event, then the control voltage is said to be "delayed".

Discharge of capacitor 54 is through small resistor 64, diode 66 and buffer transistor 68, illustrated as a Darlington pair. The discharge path is closed when transistor 68 conducts and is open when transistor 68 is nonconductive. Transistor 68 may be thought of as a transistor switch and is controlled by the output of operational amplifier 74. Because resistor 64 is small, the discharge time is quite fast, preventing the build up in capacitors 54 and 56 reaching the conductive level. In an actual circuit, resistor 65, providing the build up path for capacitor 54, is approximately twenty-two times the size of discharge resistor 64.

In actual operation, capacitor 54 is not allowed to completely discharge. Each time switch 68 is closed, it partially discharges and each time the switch is opened it begins to build up. Hence, there is a range of possible conduction times that the control voltage can reach its operable level during each half cycle of ac source voltage. The most delayed time is that near the end of the half cycle when the reference voltage reduces toward zero and causes firing to occur, in any event. The most advanced time is after PUT conduction and switch 68 has been closed only for a short time and capacitor 54 has not been allowed to appreciably discharge, thereby allowing PUT trigger to reoccur as soon as the voltage on capacitor 56 reaches the operable level again.

The voltage applied to the collector of buffer transistor 68 is via resistor 63, connected to the same chargeup voltage as resistor 65. The base voltage to buffer transistor 68 is applied through a voltage divider comprising resistors 70 and 72, through operational amplifier 74 and through resistor 76, part of a voltage divider also including resistors 78 and 80 connected to the sensed dc voltage being regulated. The reference voltage for operational amplifier 74 is established by Zener diodes 90 and 92 and the supply voltage thereto is established by the rectified ac voltage through isolation diode 98 and resistors 100 and 102.

When the sensed dc level applied to the wiper of resistor 76 is low, the voltage applied to the base of buffer transistor 68 is insufficient to cause conduction so that capacitor 54 is not kept from charging through resistor 65, thus advancing the phase angle, at which the PUT 40 will fire. Conversely, when the sensed dc level applied at the wiper of resistor 76 is high, the voltage applied to the base of buffer transistor 68 is sufficient to cause conduction of the buffer transistor before the voltage built up on capacitor 56 causes PUT conduction. As a result, the phase angle conduction of the PUT is delayed.

Conduction of PUT 40 supplies gate voltage to triac 82. When conduction of PUT 40 occurs, the conduction will be maintained by the application of current through the anode-to-cathode connection thereof to the gate of triac 82 so long as there is no reverse biasing of the PUT. The charge in capacitor 62 is more than in capacitor 56. Therefore, after the gate-to-anode voltage condition causes conduction, capacitor 56 will discharge through PUT 40 until the voltage thereof becomes less than the voltage established by capacitor 62. At this time, there is an anode-to-cathode reverse bias, which turns off the PUT.

Now referring to the remaining components, Zener diodes 90 and 92 establish the reference voltage for operation of operational amplifier 74. Diodes 94 and 96 are silicon diodes having a slightly negative temperature coefficient, which compensates for the slight positive temperature coefficient value of the Zener diodes, thereby preventing a rise in output voltage with a rise in operating temperature.

Isolation diode 98 and resistors 100 and 106 furnish lightly filtered supply voltage across capacitor 104 to bias, through resistor 102, Zener diodes 90 and 92 and diodes 94 and 96. Isolation diode 110 and resistor 123 supply voltage to Zener diodes 112, 114 and 116, which, they in turn, use to establish the supply voltage to operational amplifier 74. Capacitor 118 maintains this supply when the rectified ac source goes to zero each half cycle. Further notice the operation of diode 108. This diode has a clamping effect with Zener diodes 114 and 116. When the voltage on capacitor 104 exceeds the voltage on Zener diodes 114 and 116, diode 108 conducts, thereby keeping the value of the voltage at the level on capacitor 118. Hence, these components may be referred to as a voltage ripple limiter. Resistor 106 operates in conjunction with capacitor 104 to provide a soft start to Zener diodes 90 and 92.

Isolation diode 110 and resistor 123 also provide voltage to the pre-regulation network principally comprising Zener diode 112 and capacitor 120. Zener diode establishes a voltage level well above the control voltage conduction level to which the voltage on capacitor 56 builds. Since the supply voltage through diode 110 to Zener diode 112 is a full-wave rectified voltage, it would dip below such level at the half-cycle points were it not for capacitor 120 connected across Zener diode 112 to maintain the level high enough to permit normal performance of the PUT anode control voltage, as above described.

The output network connected to triac 82 is connected through a transformer winding which supplies a nominal 10 volts, ac. The positive cycles are supplied through diode 124, resistor 126 and transformer 128 to output terminal m. The fact that this ac voltage only acts as a gate signal means that its absolute value is relatively unimportant, so long as it exceeds a predetermined value. Therefore, it may be derived by transformer step-down action directly for the unregulated ac applied source voltage. In like manner, the negative cycles are supplied through diode 130, resistor 132 and transformer 134 to output terminal n. Therefore, when triac is gated on, the enabling voltages are alternatively applied to SCR's 32 and 34 of the output gate of the power section of the power supply shown in FIG. 1. The common terminal is terminal q. The timing of these gate signals controls the dc voltage output, as previously discussed.

One important feature of the circuit just described is the soft-start feature. Please note that when the circuit is first activated, there is a gradual exponential build up of voltage on capacitor 54 through resistor 65. This means that the conduction time for PUT 40 initially will be delayed, and hence the conduction of triac 82 will be delayed. Hence, the application of gate voltages m and n will be delayed. Notice further that voltages m and n are portions of sine waves from one half cycle to the next, with steep wave fronts, thereby providing fast initial triggering and sustained conduction of the SCR's. For all of the above reasons, sudden surges will have little effect on the output.

Likewise, sudden drop offs of applied ac will have minimal effect. This can best be seen by supposing a momentary reduction or even cessation or failure in the ac source voltage. When this happens, the reference voltage on Zener diodes 90 and 92 to operational amplifier 74 drops more rapidly than the voltage on resistor 76. This causes an output from the operational amplifier that drives buffer transistor switch 68 to hard conduction. As noted above, when transistor 68 is in hard conduction, it acts like a switch discharging capacitors 54 and 56, thereby preventing a sufficient build up thereon to cause conduction of the PUT by control voltage action.

If there is only a reduction of ac source, then the PUT is still triggered each half cycle by the reduction of the reference voltage on the gate of the PUT. This means that the most delayed control gate signals possible are applied to terminals m and n. If there is total failure of the ac source, however, then there is no force triggering of the PUT at all. During this time while the PUT is temporarily not conducting, the gate signals are removed from SCR's 32 and 34, causing them not to conduct. Hence, the output on capacitor 12 decays exponentially as determined by the impedance value of the load connected thereto.

Finally, note that resistor 76 is a variable resistor for providing an initial setting of the system. Also, if desired, when the power section of the circuit is connected to a lighting circuit, resistor 76 provides one means to provide manual dimming and even automatic dimming.

It should be noted, however, that automatic dimming may more conveniently and effectively be accomplished by providing a variable voltage element in conjunction with Zener diodes 90 and 92. Of course, a combination of voltage level changes at each of the two inputs to operational amplifier 74 can be provided instead of varying just one.

While a particular embodiment of the invention has been shown and described, it will be understood that the invention is not limited thereto, since many modifications may be made and will become apparent to those skilled in the art.

What is claimed is:

1. A power supply regulation circuit for providing timing gate signals to a power section of a power supply, the occurrence times of the power section gate signals determining the dc output level of the power section, comprising:
    a first gated semiconductor device, conduction being determined by the voltage difference between a first and a second terminal thereof;
    a second gated semiconductor device having its gate connected to the output of said first device and connectable to a voltage source for supplying the power section gate signals at the time said second device is conductive;
    a first network connected to the first of the terminals of said first device for supplying a control voltage to render said first device conductive by sensing the dc output level from the power section being regulated;
    a second network connected to the second of the terminals of said first device for supplying a control voltage to render said first device conductive, said second network supplying a reference level derived from an applied ac source voltage;
    said first device turning on when the relative levels of sensed dc output level and the applied reference level differ by a predetermined amount.

2. A power supply regulation circuit as described in claim 1, wherein said first gated semiconductor device is a programmable unijunction transistor.

3. A power supply regulation circuit as described in claim 2, wherein said first network is connected to the anode of said programmable unijunction transistor and said second network is connected to the gate of said programmable unijunction transistor.

4. A power supply regulation circuit as described in claim 1, wherein said second gated semiconductor device is a triac.

5. A power supply regulation circuit as described in claim 1, wherein said second network includes a rectifier connectable to the ac source voltage and a Zener diode, the voltage on said Zener diode being established at a steady-state dc reference voltage for a major portion of each half cycle of the ac source voltage and reducing to a low level voltage at the end of each half cycle to ensure that the predetermined level difference occurs to force conduction of said first gated semiconductor device provided advanced phase angle conduction has not already occurred during the half cycle.

6. A power supply regulation circuit as described in claim 1, wherein said second network includes:
    a first time constant network including a first capacitor connectable to the ac source voltage for building up a supply component of said control voltage on said second terminal;
    a second time constant network including a second capacitor connectable to the ac source voltage for slowly building up an operating component of said control voltage on said second terminal; and
    wherein said first network includes
    discharging means sensing the dc output level, said discharging means connected for at least partially discharging said second capacitor when the sensed dc output level is above a predetermined value to prevent advanced phase angle conduction of said first device.

7. A power supply regulation circuit as described in claim 6, wherein said discharging means includes an operational amplifier connectable to the dc output level and a transistor switch closed by the application of a voltage from the output of said operational amplifier.

8. A power supply regulation circuit as described in claim 7, wherein said transistor switch is a Darlington pair.

9. A power supply regulation circuit as described in claim 7, and including a first Zener diode connected to establish a reference voltage for said operational amplifier, the supply voltage for said first Zener diode being provided by a rectifier connectable to the ac source voltage, interruption of ac source voltage causing the operational amplifier to close said transistor switch.

10. A power supply regulation circuit as described in claim 9, and including a voltage ripple filter connected to said second Zener diode, said filter including a diode clamp for ensuring that the supply voltage to said first Zener diode does not exceed a predetermined level with fluctuations in the ac source voltage.

11. A power supply regulation circuit as described in claim 7, and including a variable resistor connectable between the input of said operation amplifier and said sensed dc output level.

12. A power supply regulation circuit as described in claim 6, and including a rectifier connectable to the ac source voltage and a pre-regulation network connected to said rectifier, to said first time constant network and to said second time constant network, said pre-regulation network comprising a Zener diode for maintaining a supply voltage to said first capacitor and said second capacitor, and a third capacitor connected in parallel with said Zener diode to maintain a supply voltage between steady-state buildup thereon caused by the applied rectified voltage thereto.

* * * * *